Dec. 11, 1951    L. N. HAMPTON ET AL    2,578,353
ELECTRICAL CONTROL DEVICE

Filed April 11, 1946    6 Sheets-Sheet 1

INVENTORS: L. N. HAMPTON
O. S. A. MESCH
C. V. OBST

BY J. MacDonald
ATTORNEY

Dec. 11, 1951 — L. N. HAMPTON ET AL — 2,578,353
ELECTRICAL CONTROL DEVICE
Filed April 11, 1946 — 6 Sheets-Sheet 2

INVENTORS: L. N. HAMPTON
O. S. A. MESCH
C. V. OBST

BY J. MacDonald
ATTORNEY

Dec. 11, 1951    L. N. HAMPTON ET AL    2,578,353
ELECTRICAL CONTROL DEVICE
Filed April 11, 1946    6 Sheets-Sheet 3

INVENTORS: L. N. HAMPTON
O. S. A. MESCH
C. V. OBST

BY J. MacDonald
ATTORNEY

Dec. 11, 1951 L. N. HAMPTON ET AL 2,578,353
ELECTRICAL CONTROL DEVICE
Filed April 11, 1946 6 Sheets-Sheet 4

INVENTORS: L. N. HAMPTON
O. S. A. MESCH
C. V. OBST
BY J. MacDonald
ATTORNEY

Dec. 11, 1951     L. N. HAMPTON ET AL     2,578,353
ELECTRICAL CONTROL DEVICE
Filed April 11, 1946     6 Sheets-Sheet 5

INVENTORS: L. N. HAMPTON
O. S. A. MESCH
C. V. OBST

BY J. MacDonald
ATTORNEY

Dec. 11, 1951    L. N. HAMPTON ET AL    2,578,353
ELECTRICAL CONTROL DEVICE
Filed April 11, 1946    6 Sheets-Sheet 6

INVENTORS: L.N. HAMPTON
O.S.A. MESCH
C.V. OBST
BY J. MacDonald
ATTORNEY

Patented Dec. 11, 1951

2,578,353

UNITED STATES PATENT OFFICE 2,578,353

ELECTRICAL CONTROL DEVICE

Leon N. Hampton, New York, Orwar S. A. Mesch, St. Albans, and Charles V. Obst, Richmond Hill, N. Y., assignors to Bell Telephone Laboratories, Incorporated, New York, N. Y., a corporation of New York Application April 11, 1946, Serial No. 661,246

6 Claims. (Cl. 201—56)

This invention relates to variable electrical control devices and more particularly to variable electrical control devices suitable for use in electrical apparatus and systems in which precise electrical potentials are required.

In some cases the electrical apparatus employed in precision electrical systems must be readily transportable and it is a desideratum that the control devices employed therein be of relatively light weight and compact construction.

The object of the invention is to provide an improved potentiometer of relatively light weight and compact construction and suitable for use in precision electrical apparatus and systems.

A feature of the invention resides in a body of the potentiometer.

Another feature resides in means provided for holding an electrical resistance element in required place in the body and for holding predetermined points of the resistance element against movement in the body.

Another feature resides in a collector ring structure and arrangement and associated parts.

Another feature resides in adjustable supporting means for a wiper contact.

Other features residing in the structures and arrangements of various members and parts in the potentiometer are pointed out and described in the specification.

In the drawings:

Fig. 9 is an enlarged cross-sectional view of a portion of the potentiometer and taken on the line 9—9 of Fig. 7 and shows a wedge device holding a resistance element in required place in the body;

Fig. 10 is a view in cross-section of portions of the wedge device and portions of the body and resistance element and is taken on the line 10—10 in Fig. 7;

Fig. 11 is a side elevational view of one part of the wedge device;

Fig. 12 is a view in cross-section of the part shown in Fig. 11 and taken on the line 12—12 in that figure;

Fig. 13 is a side elevational view of another part of the wedge device;

Fig. 14 is a view in cross-section of the part shown in Fig. 13 and taken on the line 14—14 in that figure;

Figure 1:
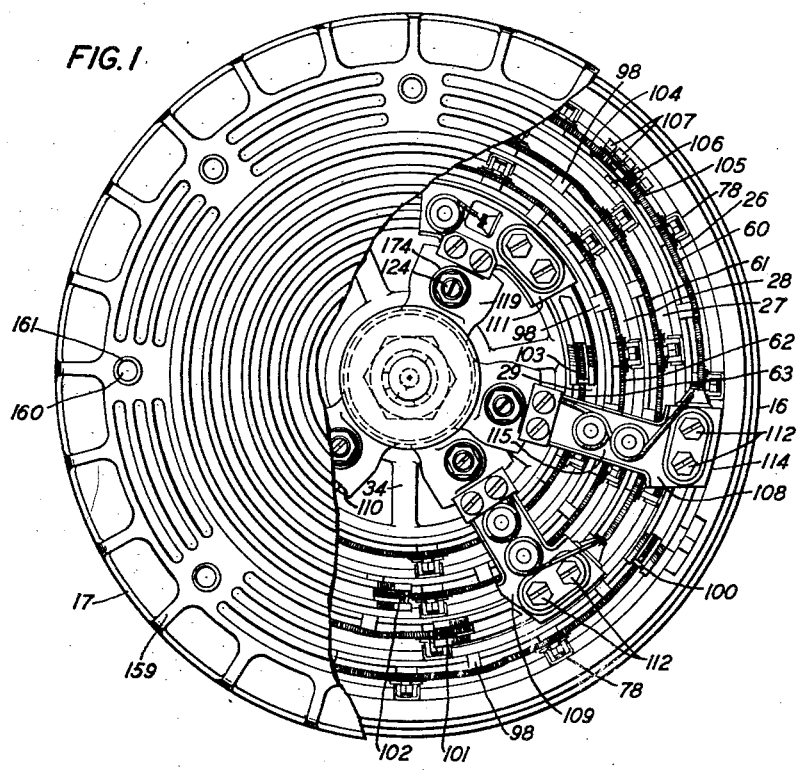
Fig. 1 is a top plan view of the potentiometer with part of a cover broken away to permit a view of the interior of the potentiometer.
Figure 2:
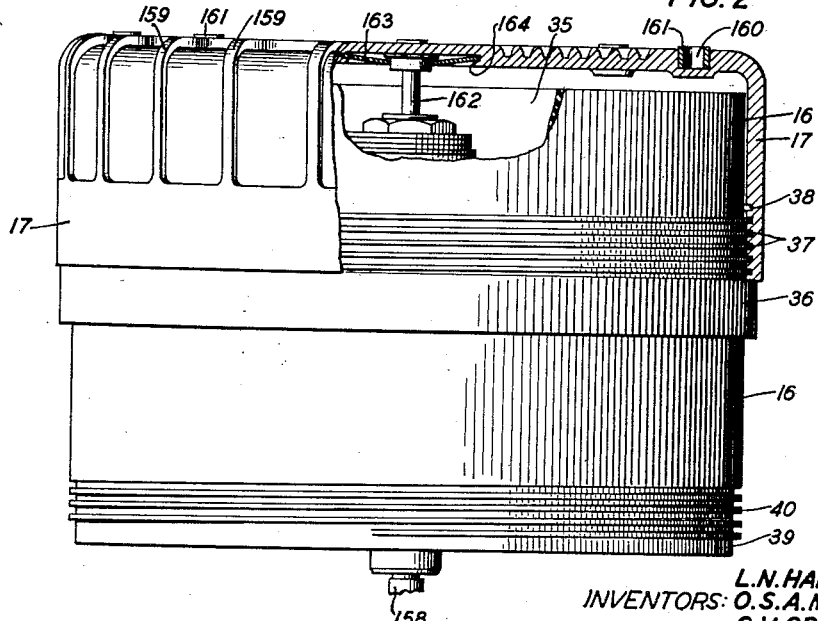
Fig. 2 is a side elevational view and partly in section of the potentiometer.

The potentiometer as shown in Figs. 1 and 2 comprises a body 16 and a cover 17 which cooperatively form a housing for potential controlling parts of the potentiometer, the potential controlling parts comprising wire wound resistance elements and wiper contacts operable in frictional engagement with the resistance elements. The number of resistance elements and the number of wiper contacts employed in the potentiometer are matters of choice and may be varied as to number and arrangement to meet certain predetermined requirements.

For the purpose of illustrating and explaining the invention and not in the sense of a limitation of the invention a certain number of resistance elements and wiper contacts are shown and described and the body structure is such that it will accommodate the resistance elements and wiper contacts shown.

The body 16 may be made of any material found suitable for the purpose but is shown in the drawings as being made of insulating material. In some cases, for instance, we have made the body of magnesium or magnesium alloy and in other cases of thermoplastic material. The body 16 may be readily produced by molding or machine cutting a suitable material to the form and structure required or both molding and machine cutting operations may be employed in producing the body 16.

Figure 3:
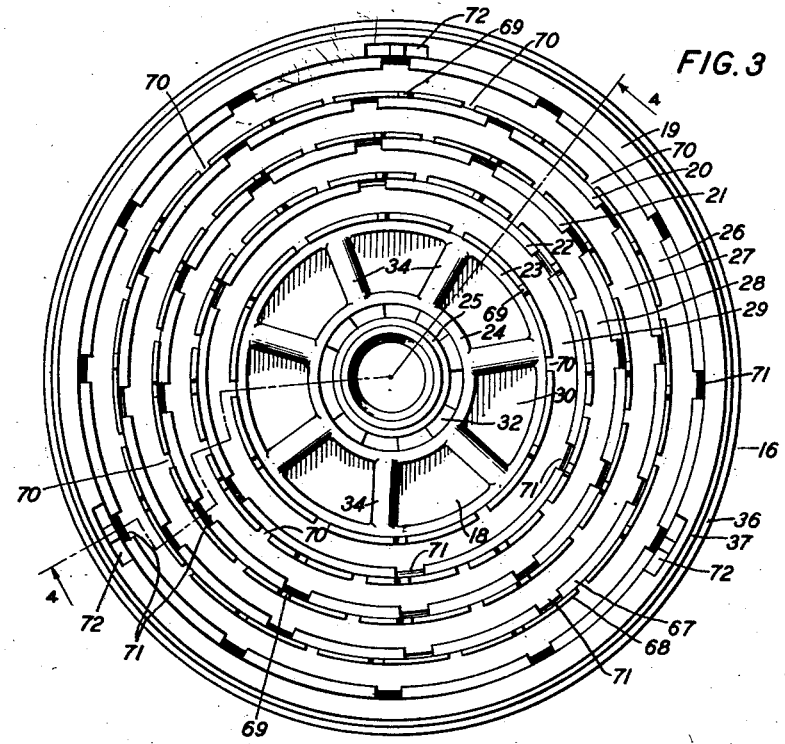
Fig. 3 is a top plan view of the body.
Figure 4:
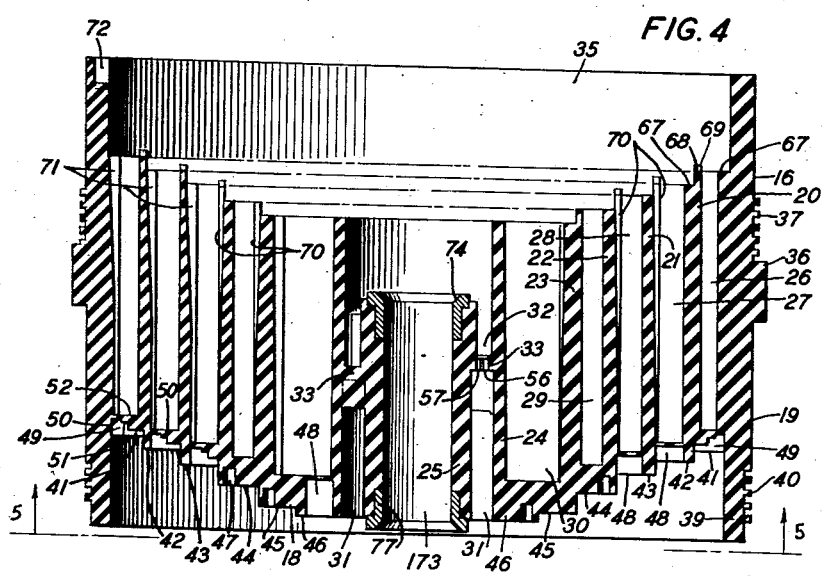
Fig. 4 is a view in cross-section of the body and taken on the line 4—4 in Fig. 3.

The body 16 is of cup-like form and as shown in Fig. 4 comprises a centrally apertured lower base wall 18, an outer wall 19 and concentrically arranged spaced walls extending from the lower base wall 18. The number of concentric walls provided in the body 16 and extending into the space defined by the outer wall 19 may vary according to requirements and comprise as shown in Figs. 3 and 4 the walls 20, 21, 22, 23, 24 and 25. The concentric walls in the body 16 extend upwardly in the body 16 to different heights and cooperate to define annular spaces 26, 27, 28, 29, 30, 31 and 32 in the body 16. The annular spaces 26 to 30, inclusive are closed at the bottom by the lower wall 18. The annular space 31 is open at the bottom and is in register with the annular space 32 but is separated from the space 32 by a horizontal wall 33 which joins the annular walls 24 and 25 and forms a top wall for the space 31 and a lower wall for the space 32. The lower base wall 18 as shown in Fig. 3 is provided with ribs 34 which extend radially from the wall 24 to the wall 23 and across the lower portion of the space 30.

The outer wall 19 of the body 16 extends considerably above the upper ends of the walls 20 to 25, inclusive to provide a relatively large space 35 in the upper portion of the body 16 for accommodation of certain parts of the potentiometer. The outer wall 19 of the body 16 is increased in thickness about midway between the upper and lower ends of the wall 19 to form an integral annular shoulder 36 which serves as a stop for the lower end of the cover 17 when the cover 17 is properly mounted on the body 16. Above the shoulder 36 the body 16 is provided with a male thread 37 which in cooperation with an internal thread 38 formed in the lower portion of the cover 17 serves to prevent accidental separation of the cover 17 from the body 16. The lower end portion of the outer wall 19 of the body 16 extends beyond the lower surface of the lower wall 18 to form an annular skirt portion 39 which is externally threaded at 40 to provide means for securing the body 16 to a support, not shown.

Figure 5:
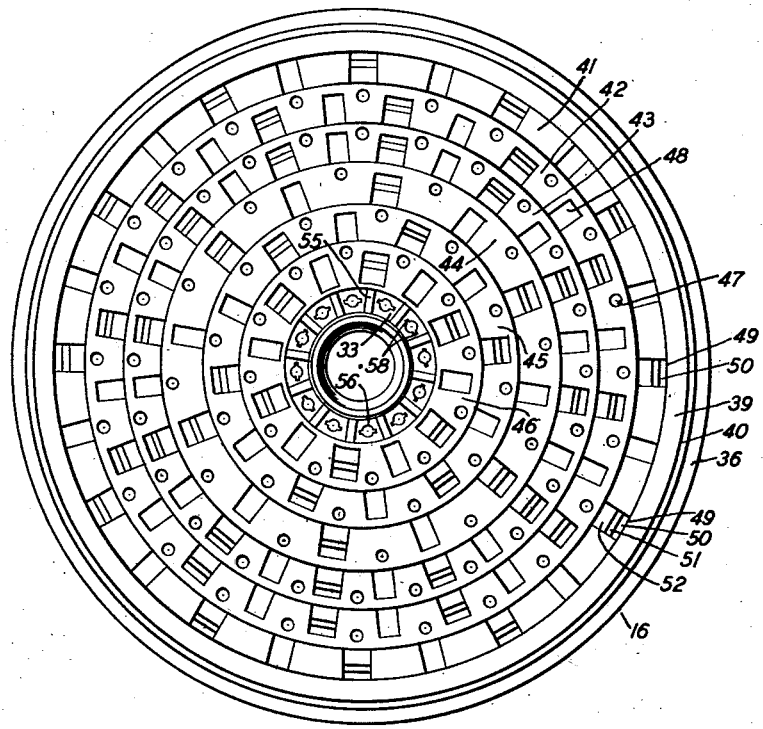
Fig. 5 is an under surface view of the body.
Figure 6:
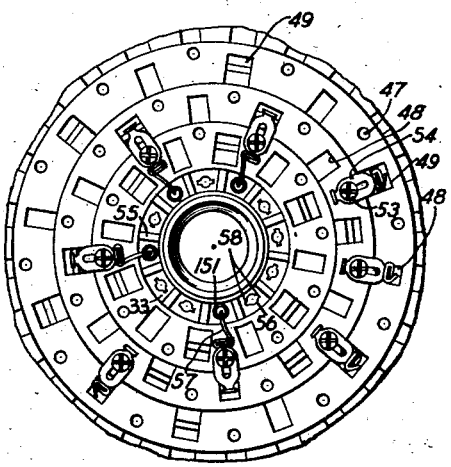
Fig. 6 is a view of a portion of Fig. 5 but with terminals mounted on the body and wires connected to the terminals and extending through apertures in the body.
Figure 8:
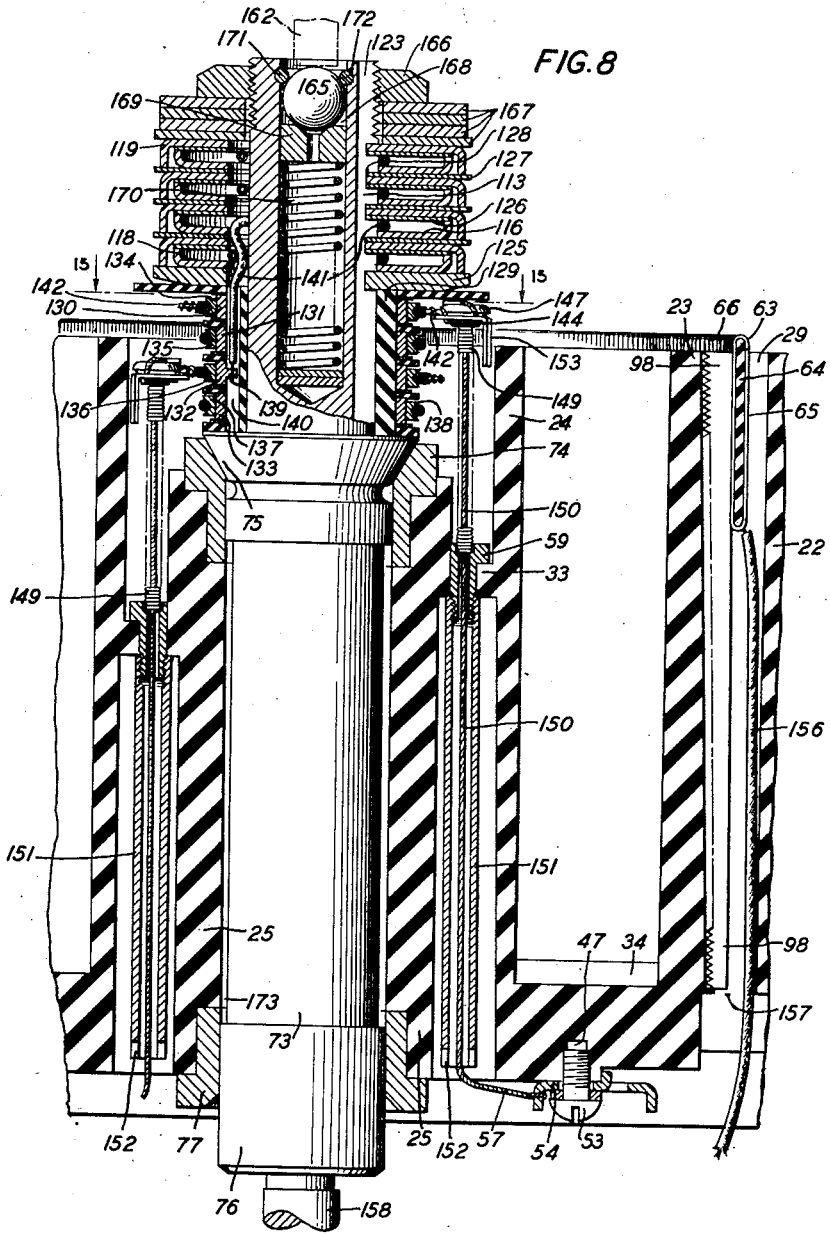
Fig. 8 is a side view, partly in section of a portion of the potentiometer and taken on the line 8—8 in Fig. 7.

The lower base wall 18 of the body 16 as shown in Figs. 4 and 5, is of stepped form comprising concentric annular horizontal wall portions 41, 42, 43, 44, 45 and 46, the wall portion 41 being the highest in plane and each of the wall portions next in order being in a lower plane than the immediately preceding wall portion. The wall portions 41 to 46 form closures for the lower ends of the annular spaces 26 to 30, respectively so that the base of each annular space is at a different level from the others. The lower surfaces of the annular horizontal wall portions 41 to 46 are recessed at spaced points to provide round recesses 47, rectangular recesses 48 and graduated depth recesses 49, the upper closure walls 50 of the recesses 49 being progressively and downwardly thickened at the points 51 and 52. The recesses 47 as shown in Figs. 6 and 8 are provided to accommodate mounting screws 53 of terminals such for instance as the terminal 54. The rectangular recesses 48 are provided to serve in the nature of knockouts to permit terminals or relatively large gauge wires to be extended through the lower wall 18 of the body 16. The graduated depth recesses 49 are provided to serve in the nature of knockouts to permit terminals or relatively small, medium or large wires to be extended through the lower wall 18 of the body 16, the portion or portions knocked out being determined by the cross-sectional dimensions of the conductor to be accommodated. The horizontal wall 33 which joins the annular walls 24 and 25 is provided with ribs 55 and spaced recesses 56, the recesses 56 being provided so that portions of the wall may be knocked out to allow the extension of wires 57 through the wall 33. The recesses 56 are also provided with wing extensions 58 so that portions of the wall 33 may be knocked out in such form that a relatively flat sheet metal terminal, not shown, may be extended through the wall 33. The recesses 56 are also provided not only to facilitate the extending of terminals or wires through the wall 33 but also to accommodate as shown in Fig. 8 a flanged bushing 59, the purpose of which will be later explained.

The annular spaces 26 to 29, inclusive, are provided to accommodate resistance elements 60, 61, 62 and 63, respectively as shown in Fig. 1, each resistance element being bent to follow in general the curvature of the predetermined annular wall in the body 16 and so that the resistance element will fit into the predetermined annular space in the body 16. The resistance elements shown in the illustrations of the potentiometer are wire wound cards each comprising as shown in Fig. 8 a card 64 and a plurality of turns of resistance wire 65 wound on the card 64. The material of the card 64 and the type of resistance wire wound on the card are matters of choice and each resistance element is set edgewise in a predetermined annular space in the body 16 and so that an upper edge 66 of the resistance element is slightly above the upper end of the annular space in which the resistance element is located.

The annular walls 20 to 25, inclusive, extend to different heights in the space defined by the wall 19 of the body 16, the height of extension being greater for each annular wall in accordance with the distance each annular wall is from the longitudinal center of the body 16. The upper edges of the annular walls 20 to 23, inclusive are shouldered to provide ledges 67 and upwardly extending edge portions 68, the latter of which have spaced further upwardly extending lug portions 69 which may be used as reference points in adjusting the wire wound cards so that predetermined turns of resistance wire on the cards will be located at required positions. A ledge 67 is also formed on the wall 19 to correspond with the ledges 67 on the other annular walls abovementioned, the ledge 67 on the wall 19 being, however, considerably below the top of the wall 19.

The outer cylindrical surfaces of the walls 20 to 23, inclusive are recessed at space points to provide notches 70 which extend downwardly from the tops of the walls 20 to 23 to the lower wall 18. The notches 70 are tapered, being deeper at the top than at the lower ends. The inner surfaces of the walls 19 to 22, inclusive are recessed at spaced points to provide slots 71 which extend downwardly from the ledges 67 to the lower wall 18. The slots 71 are tapered, the upper ends being deeper than the lower ends.

The purpose of the notches 70 and the slots 71 will be subsequently explained. The top of the wall 19 is recessed at spaced points to provide divided seats 72 for arms of a spider not shown and not used in the particular potentiometer used herein as an illustration of the invention but used in certain other potentiometers following in general the structure of the one herein shown and described.

The wall 25 defines a space 173 through which a shaft 73 is extended, the shaft 73 being arranged so that relative rotation of the shaft 73 and the body 16 may be accomplished. In the upper end of the wall 25 a conical seat bearing 74 is provided to receive a conical bearing 75 on the shaft 73. An enlarged lower end portion 76 of the shaft 73 is journaled in a bearing 77 mounted in the lower end of the wall 25.

Each resistance element in the potentiometer must be precisely mounted in place in the body 16 and so that predetermined turns of resistance wire in each resistance element will be positioned at predetermined required points in the potentiometer and will not move from the required points when the potentiometer is operated or subjected to changes in temperature met in service.

The resistance elements 60, 61, 62 and 63 after being placed edgewise in the annular spaces 26, 27, 28 and 29, respectively, in the body 16 are held in place and at predetermined required spaced points by means of wedge devices 78, each of which comprises a spring part 79 shown in Figs. 11 and 12, a channel part 80 shown in Figs. 13 and 14 and two wedge sticks 81 shown in Fig. 10.

The spring part 79 as shown in Figs. 11 and 12 is in general of wedge type form and channel like in cross-section. Portions of the side walls 82 and 83 are extended outwardly to form flanges 84 and 85, respectively, which run lengthwise of the part 79. The side walls 82 and 83 are slit downwardly from the top for a portion of their length to create a tapered spring finger portion 86 which is curved away from the main portions of the side walls 82 and 83 and so that the top of the spring finger portion 86 is considerably spaced from the top of the main portion of the spring part 79. Lugs 87 and 88 are formed on the upper ends of the side walls 82 and 83, respectively, and are bent inwardly toward each other to cooperatively form a partial closure for the top of the channel 89. Near the lower end of the spring part 79 a tongue 90 is formed and extended angularly from and beyond the main portion of the spring part 79. The lower end of the spring part 79 is provided with an angularly extending foot 91.

The channel part 80 is, in general, of wedge type form and channel like in cross-section and is constructed and dimensioned so that it will accommodate the channel portion of the spring part 79 and the wedge sticks 81—81. When the spring part 79 and the channel part 80 of the wedge device 78 are assembled and placed in the slot 71 in the body 16 the side walls 92 and 93 of the channel part 80 are in parallel relation with the side walls of the slot 71, the edges of the side walls 92 and 93 are in positions normal to the plane of the flanges 84 and 85, respectively, of the spring part 79 and the lower end of the channel part 80 rests on the foot 91 of the spring part 79. The tongue 90 on the spring part 79 extends partially across the lower portion of the annular space in the body 16 in which the wedge device 78 happens to be located. The upper end of the spring finger portion 86 of the spring part 79 bears against the inner surface of the back wall 94 of the channel part 80 and the spring finger portion 86 will be pressed more or less toward the main portion of the spring part 79 in accordance with the space available for accommodation of the wedge device 78. The side walls 92 and 93 of the channel part 80 extend in spaced relation with the side walls 82 and 83, respectively, of the spring part 79. The wedge sticks 81—81 are wedge shaped and may be driven downwardly in the spaces between the walls 82, 83 and the walls 92, 93 of the wedge device 78 to make the walls 92, 93 of the channel part 80 closely engage the corresponding side walls of the slot 71. The length of the wedge sticks 81—81 employed and the extent to which the wedge sticks extend into the spaces between the parts 79 and 80 may vary in some cases but should be sufficient to cause the parts 79 and 80 to remain in the slot 71. One edge of the wedge stick 81 is serrated as shown at 95 in Fig. 10. The serrations 95 are provided in the wedge stick 81 to make it relatively easy for an assembler of the parts to break off excess portions of the wedge stick 81 when the wedge stick 81 is longer than required.

Figure 7:
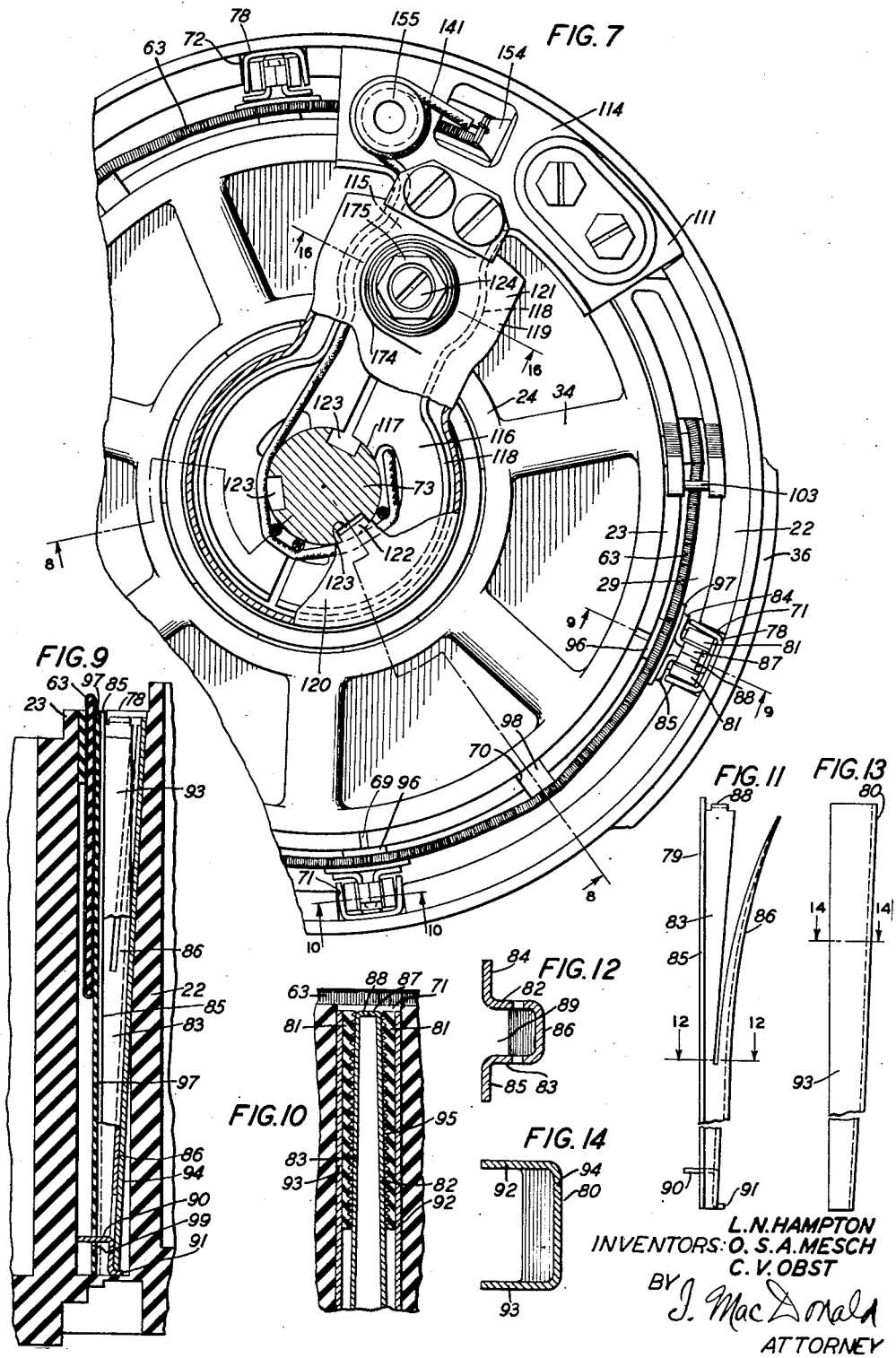
Fig. 7 is an enlarged plan view, partly in section, of a portion of the potentiometer and looking downwardly in the potentiometer.

The resistance elements 60 to 63, inclusive are all mounted in the body 16 in the same manner and are held in place in the body 16 by means of the wedge devices 78. A description of the placement and mounting of one of the resistance elements in the body 16 will therefore be sufficient for an understanding of how each resistance element is mounted in required place in the body 16. For example, and as shown in Fig. 7 the resistance element 63 is placed edgewise in the annular space 29 in the body 16 and is spaced from the annular wall 23 by spaced strips 96 disposed between the resistance element 63 and the outer cylindrical surface of the annular wall 23 and in register with the slots 71 in the annular wall 22. A pressure distributing sheet 97 is placed on the outer surface of the resistance element 63 and in register with each strip 96 and a wedge device 78 is placed in each slot 71 to urge the sheets 97, the resistance element 63 and the strips 96 toward the annular wall 23. The flanges 84 and 85 of the spring part 79 are disposed against the sheet 97 and the channel part 80 is disposed in the slot 71 and so that the inner surface of the wall 94 bears against the spring finger 86. While the wedge devices 78 are in the slots 71 but before the parts 79 and 80 of the wedge devices 78 are pressed fully down in the body 16 the resistance element 63 is adjusted in the body 16 so that predetermined parts of the resistance element 63 are in register with predetermined lugs 69 on the upper edge of the wall 23. The predetermined parts of the resistance element 63 may be in each case a particular turn of wire on the resistance element 63. With the wedge devices 78 all lightly in place and while the wedge devices 78 are operating to lightly hold the resistance element 63 in place the resistance element may be precisely adjusted in the body 16 to bring the desired points on the resistance element 63 in register with the lugs 69 by inserting wedge sticks 98 in the notches 70. The wedge sticks 98 are constructed along the lines of the wedge sticks 81 and are thicker than the strips 96. When a wedge stick 98 is forced downwardly in a notch 70 the wedge stick 98 bulges a portion of the resistance element 63 outwardly of the wall 23. It will be seen that the point of bulge of the resistance element 63 is between two points at which the resistance element 63 may be lightly held by means of the wedge devices 78 and that by applying pressure to the resistance element 63 through operation of the wedge stick 98 the resistance element 63 may be moved relative to the lugs 69 to bring a particular point or turn of wire on the resistance element 63 in register with a predetermined lug 69 on the wall 23. After the wedge sticks 98 are operated to cause the required adjustment of the resistance element 63 the parts 79 and 80 of the wedge device 78 are forced downwardly in the body 16 to develop more spring pressure in the spring finger 86 and apply sufficient pressure to the resistance element 63 at the point required to hold the predetermined point of the resistance element 63 against movement relative to the lug 69 on the wall 23. After the precise adjustment of the reistance element 63 has been made the wedge sticks 81—81 are applied to the other parts of the wedge device 78. The wedge sticks 81—81 are applied between the inner surfaces of the walls 92 and 93 of the channel part 80 and the outer surfaces of the walls 82 and 83, respectively of the spring part 79 and operate to force the walls 92 and 93 of the channel part 80 against the side walls of the slot 71 to maintain the wedge device 78 against accidental or other undesired movement in the slot 71. Since the wedge sticks 81—81 also bear against the walls 82 and 83 of the spring part 79 they help to hold the spring part 79 in required position in the channel part 80. After the wedge sticks 81—81 have been driven downwardly in the channel part 80 to required position any portions of the wedge sticks 81—81 extending above the top of the channel part 80 may be removed by breaking off the unrequired portions of the wedge sticks 81—81. The serrations on the wedge sticks 81 facilitate breaking the wedge sticks at the required points. The sheet 97 is apertured at 99 as shown in Fig. 9 to allow the tongue 96 to project therethrough and into engagement with the wall 23 to keep the lower end portion of the spring part 79 in required position in the lower end portion of the channel part 80.

The resistance elements 60, 61, 62 and 63, when mounted in the body 16 as shown in Fig. 1, follow in general the forms of the annular spaces in which they are disposed and have edge portions projecting upwardly out of the spaces so that edge portions of the resistance elements may be frictionally engaged by wiper contacts 100, 101, 102 and 103, respectively. In some cases in potentiometers constructed along the general lines of the potentiometer shown a plurality of resistance elements are mounted in the same annular space in the body 16, the resistance elements mounted in the annular space being arranged in series and so that an end of one resistance element is in register with an end of another resistance element. At points where one end of a resistance element is in register with another end of the resistance element or where one end of a resistance element is in register with an end of another resistance element track plates 104 and 105 are provided. The track plates 104 and 105 are disposed edgewise in the annular space and so that they cooperatively embrace the resistance element ends and form in effect a bridge to support the free end portion of the wiper contact when the wiper contact is passing from one resistance element end to another. The track plates 104 and 105 are held in place by a bar 106 and spring clips 107, the bar 106 being disposed between one of the track plates and an annular wall of the body and the spring clips 107 being disposed between the other track plate and another annular wall in the body and which cooperates with the first-mentioned wall to form the annular space in which the track plates are disposed.

The wiper contacts 100, 101, 102 and 103 are supported on arms 108, 109, 110 and 111, respectively, the wiper contacts being secured to the arms by means of screws 112 or other suitable fastening means. The arms 108, 109, 110 and 111 are mounted in spaced relation on the upper portion 113 of the shaft 73 so that upon relative rotation of the shaft 73 and body 16 the wiper contacts 100 to 103, inclusive are frictionally moved over edge portions of the resistance elements.

Each arm 108 to 111, inclusive, comprises a plate portion 114, an arm portion 115 which is channel shaped in cross-section and a body portion 116. The body portion 116 as shown in Fig. 7 is apertured to receive the shaft 73 and is made like an incomplete ring so that it may be sprung open to accommodate the shaft 73 and is provided with inwardly extending spaced projections 117 to frictionally engage the shaft 73. An upwardly extending flange 118 is provided on the outer edge portions of the arm portion 115 and the body portion 116. A mounting plate 119 is provided for each arm 108 to 111, inclusive. The mounting plate 119 has a flanged annular body portion 120 and a flanged arm portion 121, the body portion 120 being constructed to fit over the body portion 116 and the arm portion 121 being constructed to fit over the arm portion 115 above described. The body portion 120 is provided with inwardly extending lugs 122 to engage in a set of spaced grooves 123 formed in the shaft 73 and extending longitudinally of the upper portion of the shaft 73. Each arm 108 to 111, inclusive, is releasably secured to its mounting plate 119 by a bolt or other suitable fastening means 124 and means which will be later described are provided to permit and facilitate adjustment of each arm relative to its mounting plate 119.

The arms 108 to 111, inclusive and their mounting plates 119 are arranged in stack formation as shown in Fig. 8 and with washers 125, 126 and 127 on the upper portion of the shaft 73, the washers 125 to 127, inclusive, having inwardly extending lug portions such as 128 to engage in the grooves 123 formed in the shaft 73. The stack of parts is supported by an insulating tube 129 which is mounted on the shaft 73, the lower end of the tube 129 resting on the upper end of the bearing 75. The insulating tube 129 provides an insulating support for spaced conducting rings 130, 131, 132 and 133 carrying respectively collector rings 134, 135, 136 and 137 of good electrical conducting material. Each collector ring 134 to 137, inclusive, has an annular groove 138 formed in its outer surface and is securely mounted on its associated conducting ring. Each conducting ring 130 to 133, inclusive, is provided with an inwardly extending projection 139. The insulating tube 129 is provided with spaced longitudinal passageways 140 and into which the projections 139 extend. The passageways 140 form receptacles for insulated wires 141 which are led from the wiper contacts to the conducting rings.

Figure 15:
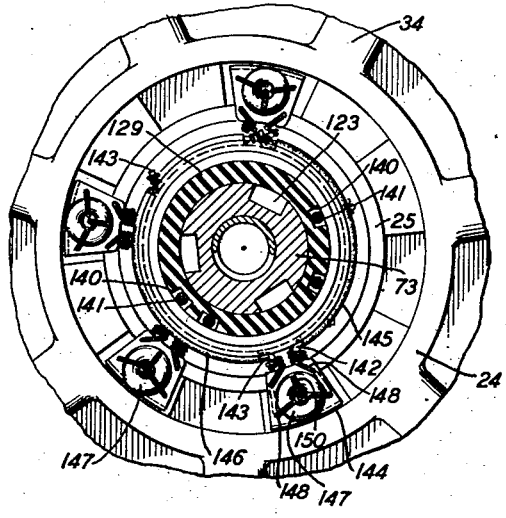
Fig. 15 is a top view, partly in section of a portion of the potentiometer and taken on the line 15—15 in Fig. 8.

Each collector ring 134 to 137, inclusive is in frictional engagement with an individual pair of wire members 142 and 143 shown in Fig. 15. The wires 142 and 143 are attached to and extend from a conducting plate 144 and cooperate to embrace the grooved portion of the collector ring, the wires 142 and 143 being bent to follow the curvature of the collector ring. The bent wires 142 and 143 are wrapped with wire, the wire 142 having a wrapping of wire 145 and the wire 143 having a wrapping 146 in frictional engagement with the grooved portion of the collector ring. The conducting plate 144 is apertured to accommodate an eyelet 147 which is secured to the conducting plate 144. The wire wrappings 145 and 146 are led through apertures 148 in the plate 144 and are brought over the top of the eyelet 147 and are connected to the eyelet 147. The lower portion of the eyelet 147 as shown in Fig. 8 is secured by means of solder or in any other suitable manner to the top of a helical spring 149, the lower end of which is secured to the flanged bushing 59. The plate 144 and the eyelet 147 are therefore supported by a helical spring 149 extending upwardly from a fixed member (the bushing 59) and while operable to move relative to the collector ring will by virtue of the helical spring 149 be constantly urged to normal position. Extended through the eyelet 147 and secured thereto is a conductor wire 150 which extends downwardly through the spring 149, the bushing 59 and an internally threaded pipe 151 from the lower end of which the conductor wire 150 is led and connected to the terminal 54. The pipe 151 has threaded connection with the lower threaded end of the bushing 59 and is provided with a screwdriver slot 152 at its lower end to facilitate connecting of the pipe 151 to the bushing 59.

The plate 144 is provided with a downwardly extending leg 153 which is engageable with the wall 24 to limit extent of movement of the plate 144 outwardly relative to the collector ring.

In some cases the conductor wire 150 may be led from the pipe 151 directly to a terminal, not shown and, not mounted on the body 16. Each wiper contact 100 to 103, however, has electrical connection with some remote point and the course of the connection may be understood by a consideration of the connection shown for the wiper contact 103. The conductor of the insulated wire 141 as shown in Fig. 7 is connected to a heel portion 154 of the wiper contact 103 and is then snubbed around a post 155 supported on the arm 111. The wire 141 is extended from the post 155 through the space between the arm 111 and its mounting plate 119 and then downwardly between the shaft 73 and the body portion 116 of the arm 111 and through a passageway 140 in the insulating tube 129 to a projection 139 on the conducting ring 133. The conductor of the insulated wire 141 is connected to the projection 139 on the conducting ring 133. The collector ring 137 on the conducting ring 133 is in frictional engagement with the wire wrappings 145 and 146 which are electrically connected to an eyelet 147 on a plate 144. A wire 150 connected to the eyelet 147 extends downwardly through a spring 149, a bushing 59 and a pipe 151 and outwardly through the lower portion of the body 16 and may be connected to a terminal 54 mounted on the lower portion of the body 16 or may be led to any remote point required.

End or other predetermined portions of the resistance elements may be electrically connected to terminals 54 on the lower portion of the potentiometer by means of lead wires such as the lead wire 156 shown in Fig. 8. In this case the lead wire 156 is connected to a predetermined turn of resistance wire on the resistance element 66 and is led downwardly through the annular space 29 in the body of the potentiometer and through the lower wall of the body 16 by way of an opening 157 formed by knocking out the closing wall of one of the knockouts 48. It is obvious from a consideration of Fig. 8 that the lead wire 156 may be attached to a terminal 54 or to any other suitable point after the lead wire 156 is extended through the lower wall of the body of the potentiometer.

Relative rotation of the shaft 73 and the body 16 may be readily accomplished by connecting a rotating member, not shown, to the stub 158 on the shaft 73 while the body 16 is held stationary, or the body 16 may be rotated by any suitable means while the shaft 73 is held stationary. Relative rotation of the shaft 73 and the body will cause relative rotation of the wiper contacts 100 to 103, inclusive, and the resistance elements 60 to 63, inclusive.

The cover 17 as shown in Fig. 2 is a cup-shaped member removably mounted in inverted position on the body 16 and constructed to fit over the upper portion of the body 16 and screw threadably engage the screwthread 37 on the body 16. Rib-like embossings 159 are provided on the outer surface of the cover 17 to facilitate manual application of the cover 17 to the body 16. Recesses 160 with tubular inserts 161 mounted therein are provided on the cover 17 to facilitate tightening or loosening the cover 17 by means of a suitable tool such for instance as a wrench device. Extending downwardly within the cover 17 and located in the central portion thereof is a pin 162 which is rotatably supported in an apertured disc 163 supported in an undercut recess 164 in the under surface of the cover 17. When the cover 17 is applied to the body 16 the pin 162 engages a ball 165 mounted in the upper portion of the shaft 73 and the ball 165 and the pin 162 in cooperation serve as an end thrust bearing for the shaft 73 to keep the bearing 75 on the shaft 73 seated in the seat bearing 74. The pin 162 also insures that the central portion of the cover 17 will not engage the upper end of the shaft 73 and on which a nut 166 and a stack of washers 167 are mounted to hold the stacked portions of the wiper arms, mounting plates and associated washers in place on the shaft 73.

The ball 165 is located in a well 168 formed in the upper end portion of the shaft 73 and rests on a plunger 169 supported on the upper end of a helical spring 170 located in the well 168. A ring 171 sprung into an annular indentation 172 in the shaft 73 and positioned above the ball 165 maintains the ball 165 in the well 168. When the pin 162 on the cover 17 engages the ball 165 and the cover 17 is being moved to its normal position on the body 16 the ball 165 is pressed away from the ring 171 and pressure is developed in the spring 170. The thrust of the pin 162 on the ball 165 and the pressure developed in the spring 170 keeps the conical bearing 75 on the shaft 73 seated in the seat bearing 74.

As previously mentioned with regard to the wiper contact supporting arms 108 to 111, inclusive, means are provided to permit and facilitate adjustment of each arm relative to its mounting plate 119. The means provided for the purpose are shown in detail in Figs. 16 to 19, inclusive.

Figure 16:
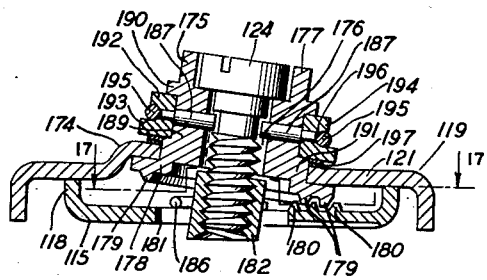
Fig. 16 is an enlarged view, in cross-section, of the adjustable supporting means for the wiper contact and taken on the line 16—16 in Fig. 7.

As shown in Figs. 7 and 16, the flanged arm portion 121 of the mounting plate 119 has an apertured and sloped embossing 174 bulged upwardly in the region of location of the bolt 124. The bolt 124 is rotatably supported in a spiral threaded adjustment member 175 which is rotatably supported in the aperture in the sloped embossing 174. The spiral threaded adjustment member 175 has a central bore 176 dimensioned to accommodate the shank portion of the bolt 124 and has a recessed head portion 177 formed to receive the head of the bolt 124. The outer surface of the head portion 177 is formed to make it adaptable to be engaged by a wrench, not shown, to facilitate rotation of the spiral threaded adjustment member 175. The lower end of the spiral threaded adjustment member 175 is enlarged in diameter to provide a disc portion 178 on the lower surface of which is formed a spiral thread 179 adapted to engage embossings 180 formed on the upper surface of the arm portion 115 of, for instance, the arm 111. The embossings 180 form, in effect, portions of a screw thread of the same pitch as the spiral thread 179 and are located between one side of the arm portion 115 and an elongated central aperture 181 formed in the arm portion 115. The disc portion 178 extends at an angle relative to the upper surface of the arm portion 115, the upper surface of the disc portion 178 being in engagement with the under surface of the sloped embossing 174 and the spiral thread 179 being in engagement with the embossings 180 on the arm portion 115. When the spiral threaded adjustment member 175 is rotated, the arm portion 115 is laterally moved by virtue of the spiral thread 179 and the embossings 180, the direction of movement being determined by the direction of rotation of the spiral threaded adjustment member 175. When the arm portion 115 is thus moved, the arm 111 rotates relative to the shaft 73 and causes the wiper contact, such for instance as the wiper contact 103, to move along the resistance element 63. By suitable operation of the spiral threaded adjustment member 175, precise adjustment of a wiper contact may be made to bring the wiper contact to a particular predetermined turn of wire on the resistance element when the arm supporting the wiper contact is brought to a predetermined position. Also, by suitable operation of the spiral threaded adjustment member 175, a wiper contact may be adjusted so that it extends in parallel relation with an engaged turn of wire or in angular relation with an engaged turn of wire on the resistance element served by the wiper contact.

Figure 17:
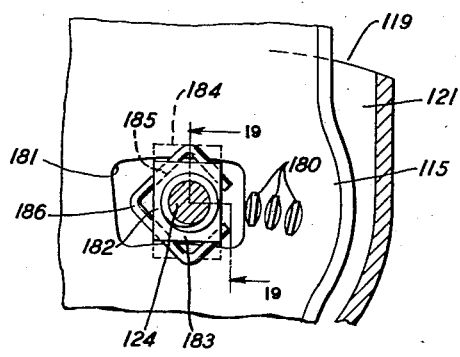
Fig. 17 is an enlarged top view of a portion of the adjustable supporting means shown in Fig. 16 and taken on the line 17—17 in Fig. 16 with certain parts removed.
Figure 19:
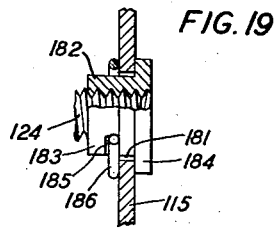
Fig. 19 is a view, partly in section, of a nut detail and associated parts employed in the adjustable supporting means shown in Fig. 16.

The bolt 124 is equipped with a nut 182 which is used in cooperation with the bolt 124 to hold the arm portion 115 within the space defined by the flanged arm portion 121 of the mounting plate 119. The nut 182 comprises a block-like body 183 terminating at its lower end, as shown in Figs. 17 and 19, in a rectangular enlarged base portion 184. The nut 182 is internally threaded to receive the threaded end of the bolt 124 and the block-like body 183 is dimensioned to fit the smaller dimension of the elongated aperture 181 in the arm portion 115. When the nut 182 is applied to the bolt 124, the block-like body extends upwardly through the aperture 181 in the arm portion 115 and when the bolt 124 is tightened, the base portion 184 of the nut engages the under surface of the arm portion 115 to hold the arm portion 115 against the mounting plate 119. The corners of the block-like body portion 183 of the nut 182 are provided with grooves 185 to receive a spring wire clip 186 which extends diagonally across portions of the elongated aperture 181 and over portions of the upper surface of the arm portion 115, the function of the spring wire clip 186 being to allow slight downward movement of the nut 182 when the bolt 124 is turned counter-clockwise to slightly release the arm portion 115 from tight pressure against the mounting plate 119 and still prevent the nut 182 from dropping through the elongated aperture 181 in the arm portion 115.

Figure 18:
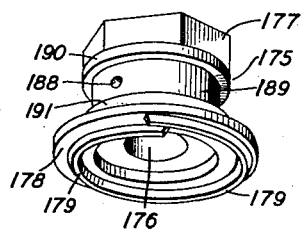
Fig. 18 is an enlarged view in perspective of a spiral threaded adjustment member employed in the adjustable supporting means shown in Fig. 16.

The spiral threaded adjustment member 175, as shown in Fig. 16, is equipped with pins 187—187 which extend through transverse apertures 188, shown in Fig. 18, formed in a neck portion 189 of the spiral threaded adjustment member 175, the neck portion 189 being defined by a flange 190 and a shoulder 191 formed on the spiral threaded adjustment member 175. The pins 187 extend a sufficient distance into the bore 176 of the spiral threaded adjustment member 175 to prevent undue complete upward withdrawal of the bolt 124 from the spiral threaded adjustment member 175; the pins 187 however do not normally engage the bolt 124. The outer ends of the pins 187 are reduced in diameter to extend into apertures formed in a diametrically divided two-part retainer ring 192 which is located in the neck portion 189 and bears against the shoulder 191 and the under surface of the flange 190 on the spiral threaded adjustment member 175. The two parts 193 and 194 of the retainer ring 192 are held clamped about the neck portion 189 of the spiral threaded adjustment member 175 by means of a snap spring device 195 which almost encircles the retainer ring 192 and rests in grooves 196 formed in the outer surfaces of the two parts 193 and 194 of the retainer ring 192. The retainer ring 192 in addition to holding the pins 187—187 against outward movement also serves as a retainer ring for the spiral threaded adjustment member 175 and holds the spiral threaded adjustment member 175 against downward movement in the flanged arm portion 121 of the mounting plate 119, washers 197 being disposed between the under surface of the retainer ring 192 and the upper surface of the flanged arm portion 121.

The means comprising the spiral threaded adjustment members 175 for adjusting the wiper contact supporting arms are of considerable advantage in a potentiometer of the type shown and described since through suitable operation of the spiral threaded adjustment members 175, the wiper contacts may be precisely set relative to particular turns of wire on the resistance elements after the resistance elements have been mounted in the body and the wiper contacts and supporting arms have been mounted in place. To make a precise adjustment of a wiper contact, it is only necessary to loosen the bolts 124 and turn the spiral threaded adjustment member 175 in the required manner to make the arm portion 115 rotate relative to the shaft 73 to the required extent to bring the wiper contact to the required position relative to the particular turn of resistance wire and then tighten the bolt 124.

What is claimed is:

1. In an electrical device in which a wiper contact engages a resistance element, a body, a pair of spaced walls in said body and defining a space in said body to receive the resistance element and a spring wedge shaped device in the space defined by said walls and operating against one of said walls and applying spring pressure to the resistance element to hold the resistance element in place in said body for engagement by the wiper contact.

2. In an electrical device in which a wiper contact engages a resistance element, a body, a pair of concentric spaced walls in said body and defining a space in said body to receive the resistance element and hollow spring wedge shaped means with wedge sticks therein disposed in the space in said body and spaced along the resistance element and applying spring pressure against said walls and at spaced points along the resistance element and operating to hold the resistance element at spaced points and in position in said body for engagement by the wiper contact.

3. In an electrical device in which a resistance element is supported for engagement by a wiper contact spring, wedge shaped means for supporting the resistance element at spaced points along the resistance element and a body for holding the resistance element and said spring wedge shaped means, said body comprising a lower wall, spaced walls extending upwardly from said lower wall and cooperating with each other and with said lower wall to define a space in which the resistance element and said spring wedge shaped means are located and spaced slots formed in at least one of said spaced walls and extending downwardly in and opening into the space defined by said walls and providing accommodations for said spring wedge shaped means.

4. In an electrical device in which resistance elements are concentrically arranged and supported in spaced relation for engagement by wiper contacts, a body comprising a lower wall, recesses formed in said lower wall to provide knock-outs through which wires can be extended, spaced walls extending upwardly from said lower wall and cooperating with said lower wall to define annular spaces in said body to accommodate the resistance elements, spaced slots and spaced notches formed in said spaced walls and opening into the annular spaces in said body, said notches being not in register with said slots, spring wedge shaped means supported in said slots and cooperating with said spaced walls to hold the resistance elements in place in said body and wedge shaped stick means disposed in said notches and in engagement with portions of the resistance elements and operating to bulge portions of the resistance elements from the walls in which said notches are formed.

5. In an electrical device comprising a body, a resistance element supported in the body and a wiper contact in engagement with the resistance element, an arm supporting the wiper contact, a shaft mounted in the body and supporting said arm said shaft being rotatable relative to the body, a conducting ring carried by said shaft, a grooved collector ring supported on said conducting ring, means electrically connecting the wiper contact to said conducting ring, flexible conductors disposed in the groove in said grooved collector ring and embracing said collector ring, a helical spring secured at one end and mounted in the body, said helical spring extending into register with said grooved collector ring, an eyelet supported on said helical spring and in register with said grooved collector ring, said eyelet being electrically connected to said flexible conductors and a conductor wire extending through said helical spring and electrically connected to said eyelet.

6. In an electrical device in which a card-like electrical element is mounted in a body, spaced walls in the body defining a space in the body for accommodation of the electrical element, a channel member disposed between one of the spaced walls and the electrical element, a spring fingered member nested in said channel member and cooperating with said channel member to apply spring pressure to a predetermined point on the electrical element and urge the electrical element toward another of said spaced walls with sufficient pressure to hold the electrical element in place in the body and wedge stick means disposed in said channel member and bearing against said channel member and said spring fingered member to hold said spring fingered member in said channel member.

LEON N. HAMPTON.
ORWAR S. A. MESCH.
CHARLES V. OBST.

REFERENCES CITED

The following references are of record in the file of this patent:

UNITED STATES PATENTS

| Number | Name | Date |
| --- | --- | --- |
| 733,610 | Yates | July 14, 1903 |
| 1,577,048 | Thomas | Mar. 16, 1926 |
| 2,403,989 | Mallina | July 16, 1946 |
| 2,419,952 | Konicek et al. | May 6, 1947 |